United States Patent
Andre et al.

(10) Patent No.: US 10,998,754 B2
(45) Date of Patent: May 4, 2021

(54) DEVICE AND METHOD FOR CONTROLLING TRANSFER OF DC POWER BETWEEN NODES

(71) Applicant: Sony Corporation, Tokyo (JP)

(72) Inventors: Alexis Andre, Tokyo (JP); Annette Werth, Tokyo (JP)

(73) Assignee: Sony Corporation, Tokyo (JP)

( * ) Notice: Subject to any disclaimer, the term of this patent is extended or adjusted under 35 U.S.C. 154(b) by 147 days.

(21) Appl. No.: 15/544,990

(22) PCT Filed: Dec. 22, 2015

(86) PCT No.: PCT/JP2015/085779
§ 371 (c)(1),
(2) Date: Jul. 20, 2017

(87) PCT Pub. No.: WO2016/121270
PCT Pub. Date: Aug. 4, 2016

(65) Prior Publication Data
US 2018/0278083 A1 Sep. 27, 2018

(30) Foreign Application Priority Data
Jan. 30, 2015 (JP) .............................. JP2015-017543

(51) Int. Cl.
*H02J 7/34* (2006.01)
*H02J 1/10* (2006.01)
(Continued)

(52) U.S. Cl.
CPC .............. *H02J 7/34* (2013.01); *G05B 19/042* (2013.01); *H02J 1/10* (2013.01); *H02J 1/14* (2013.01);
(Continued)

(58) Field of Classification Search
CPC ........................................................ H02J 7/34
(Continued)

(56) References Cited

U.S. PATENT DOCUMENTS 6,470,383 B1 * 10/2002 Leshem .................. G06F 11/32
709/223
9,543,763 B2    1/2017 Sako et al.
(Continued)

FOREIGN PATENT DOCUMENTS

EP    2 650 840 A1    10/2013
JP    03-198623 A    8/1991
(Continued)

OTHER PUBLICATIONS

Yukiko Hirayama, Translation of "System, Information Processing Method, and Computer Program", Japanese Patent Application JP 2013187935, Sep. 19, 2013, Espacenet Machine Translation (Year: 2013).*

(Continued)

*Primary Examiner* — Robert E Fennema
*Assistant Examiner* — Christopher W Carter
(74) *Attorney, Agent, or Firm* — Wolf, Greenfield & Sacks, P.C.

(57) ABSTRACT

To effectively determine premises as a counterpart for transmission or reception of power in a case of interchanging direct-current power between respective premises
A control device (110) according to the present invention includes a power control unit (114) configured to determine a node that performs transmission or reception of direct-current power to or from an own node by using profile information indicating a power usage state of each of the nodes exchanging direct-current power with each other.

10 Claims, 14 Drawing Sheets

(51) Int. Cl.
  *H02J 1/14* (2006.01)
  *H02J 13/00* (2006.01)
  *G05B 19/042* (2006.01)
  *H02J 3/38* (2006.01)
  *H02J 7/00* (2006.01)
  *H02J 7/35* (2006.01)
  *H02J 9/06* (2006.01)

(52) U.S. Cl.
  CPC ............ *H02J 3/382* (2013.01); *H02J 7/0047* (2013.01); *H02J 13/0003* (2013.01); *H02J 13/0017* (2013.01); *G05B 2219/2639* (2013.01); *H02J 7/35* (2013.01); *H02J 9/06* (2013.01); *Y02B 10/70* (2013.01); *Y02B 90/20* (2013.01); *Y02E 40/70* (2013.01); *Y04S 10/123* (2013.01); *Y04S 20/12* (2013.01)

(58) Field of Classification Search
  USPC ......................................................... 700/295
  See application file for complete search history.

(56) References Cited

U.S. PATENT DOCUMENTS

| | | | |
|---|---|---|---|
| 10,158,228 B2 | 12/2018 | Kawamoto et al. | |
| 2006/0095563 A1* | 5/2006 | Benjamin | H04L 41/22 709/224 |
| 2008/0114499 A1* | 5/2008 | Hakim | G06Q 50/06 700/291 |
| 2013/0006831 A1* | 1/2013 | Mise | G06Q 10/06 705/37 |
| 2013/0080950 A1* | 3/2013 | Alford, Jr. | G06F 3/04817 715/765 |
| 2013/0138256 A1 | 5/2013 | Sako et al. | |
| 2013/0253973 A1 | 9/2013 | Ishibashi | |
| 2014/0214225 A1* | 7/2014 | Burke | G05B 13/02 700/295 |
| 2014/0336837 A1* | 11/2014 | Kiuchi | G05B 15/02 700/295 |
| 2015/0324908 A1* | 11/2015 | Starikova | G06Q 40/02 705/38 |
| 2016/0329744 A1 | 11/2016 | Werth et al. | |
| 2017/0163051 A1 | 6/2017 | Morita et al. | |
| 2017/0229861 A1 | 8/2017 | Kawamoto et al. | |
| 2017/0373510 A1 | 12/2017 | Morita | |
| 2018/0224914 A1 | 8/2018 | Morita | |

FOREIGN PATENT DOCUMENTS

| | | |
|---|---|---|
| JP | 2004-015882 A | 1/2004 |
| JP | 2012-125063 A | 6/2012 |
| JP | 2013-187935 A | 9/2013 |
| JP | 2013-233034 A | 11/2013 |

OTHER PUBLICATIONS

Written Opinion and English translation thereof dated Mar. 15, 2016 in connection with International Application No. PCT/JP2015/085779.
International Preliminary Report on Patentability and English translation thereof dated Aug. 10, 2017 in connection with International Application No. PCT/JP2015/085779.
International Search Report and English translation thereof dated Mar. 15, 2016, in connection with International Application No. PCT/JP2015/085779.
U.S. Appl. No. 15/501,024, filed Feb. 1, 2017, Kawamoto et al.
U.S. Appl. No. 15/325,126, filed Jan. 10, 2017, Morita et al.
U.S. Appl. No. 15/108,706, filed Jun. 28, 2016, Werth et al.
U.S. Appl. No. 13/680,748, filed Nov. 19, 2012, Sako et al.
U.S. Appl. No. 15/544,967, filed Jul. 20, 2017, Morita.
U.S. Appl. No. 15/580,326, filed Dec. 7, 2017, Morita.

* cited by examiner

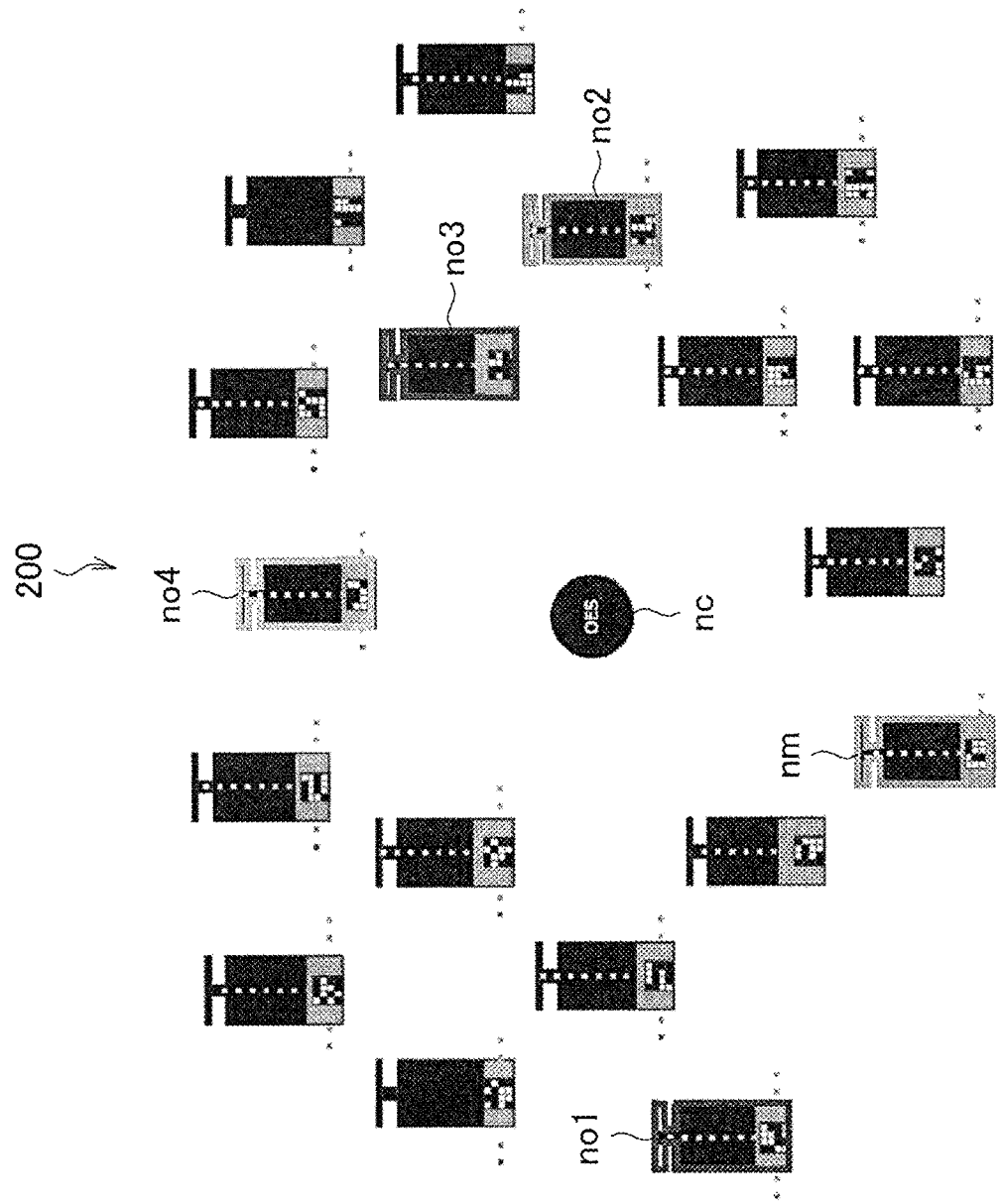

DEVICE AND METHOD FOR CONTROLLING TRANSFER OF DC POWER BETWEEN NODES

CROSS-REFERENCE TO RELATED APPLICATIONS

This application is a U.S. National Stage Entry under 35 U.S.C. § 371 of International Application No. PCT/JP2015/085779, filed in the Japanese Patent Office on Dec. 22, 2015, which claims priority to Japanese Patent Application Number JP2015-017543, filed in the Japanese Patent Office on Jan. 30, 2015, each of which is incorporated by reference herein in its entirety.

TECHNICAL FIELD

The present disclosure relates to a control device, a control method, and a computer program.

BACKGROUND ART

There has been known an uninterruptible power supply device provided with a storage battery is capable of supplying continuously power from the storage battery to equipment connected thereto for a predetermined time without causing power interruptions even when power from an input power source is cut off. Techniques have been developed for supplying power to customers in which such a power supply device is provided when an abnormality occurs in supplying power due to power interruption, shortage of storage battery capacity, or other reasons.

Techniques for storing power generated by what is called renewable energy such as sunlight, solar heat, hydropower, wind power, biomass, geothermal power, or other energy sources in a storage battery and for using the power stored in the storage battery have been developed. In one example, Patent Literature 1 discloses a technique of "visualization" of a flow of electric power including power generated by renewable energy.

CITATION LIST

Patent Literature

Patent Literature 1: JP 2013-233034A

DISCLOSURE OF INVENTION

Technical Problem

In a power supply system, there are a plurality of customer's premises that store power generated by renewable energy in a storage battery and use the power stored in the storage battery, This power supply system can be constructed to interchange power stored in the storage battery between the premises. It is desirable for this power supply system to determine effectively premises as a counterpart for transmission or reception of power.

In view of this, the present disclosure provides a novel and improved control device, control method, and computer program, capable of effectively determining premises as a counterpart for transmission or reception of power in a case of interchanging direct-current power between respective premises.

Solution to Problem

According to the present disclosure, there is provided a control device including: a power control unit configured to determine a node that performs transmission or reception of direct-current power to or from an own node by using profile information indicating a power usage state of each of the nodes exchanging direct-current power with each other.

In addition, according to the present disclosure, there is provided a control method including: determining, by a control device, a node that performs transmission or reception of direct-current power to or from an own node by using profile information indicating a power usage state of each of the nodes exchanging direct-current power with each other.

In addition, according to the present disclosure, there is provided a computer program for causing a computer to execute: determining a node that performs transmission or reception of direct-current power to or from an own node by using profile information indicating a power usage state of each of the nodes exchanging direct-current power with each other.

Advantageous Effects of Invention

As described above, according to the present disclosure, it is possible to provide the novel and improved control device, control method, and computer program, capable of effectively determining premises as a counterpart for transmission or reception of power in a case of interchanging direct-current power between respective premises.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 14 is a diagram illustrated to describe an example of information displayed on a display device 160 by the node 100 according to an embodiment of the present disclosure.

MODE(S) FOR CARRYING OUT THE INVENTION

Figure 1:
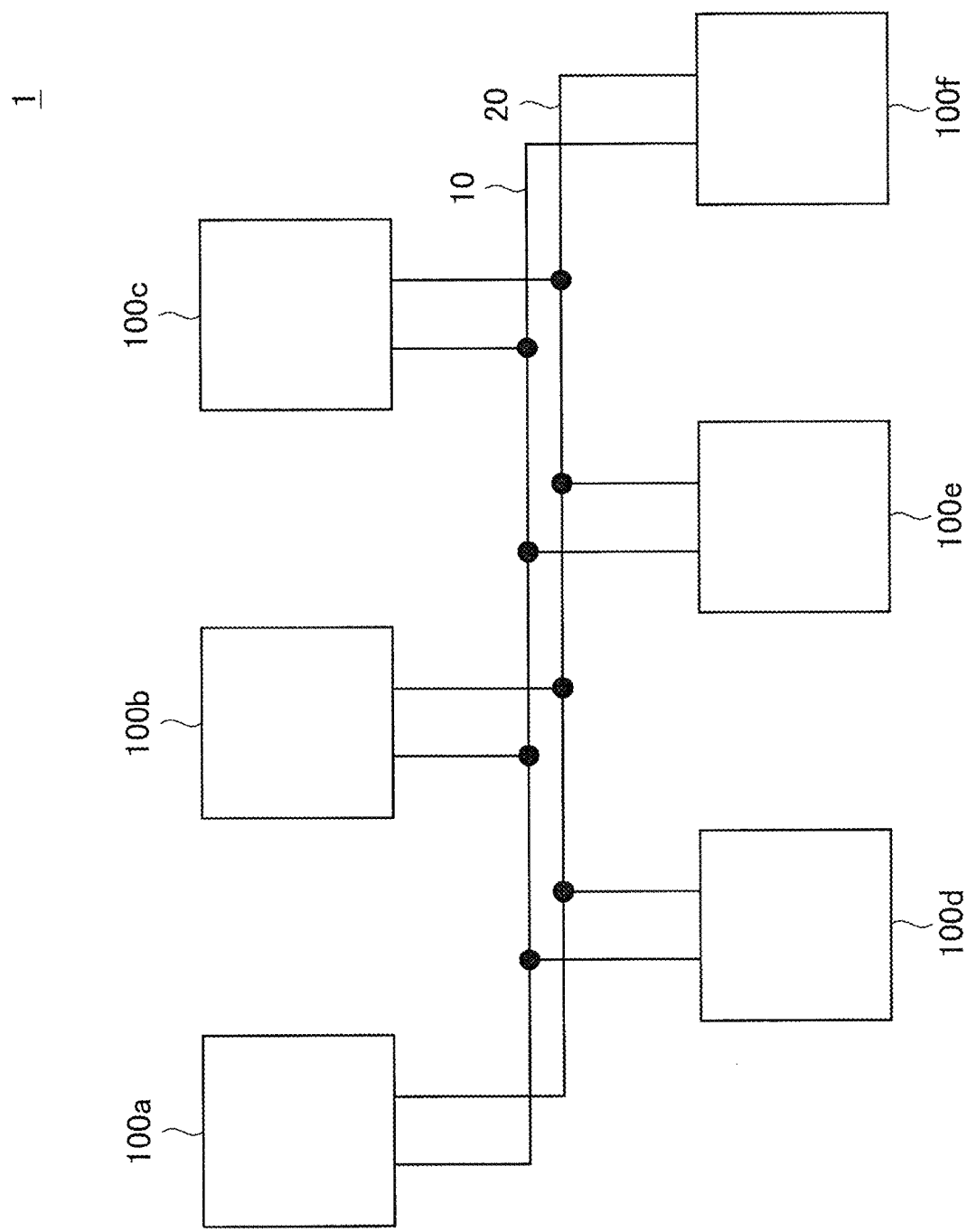
FIG. 1 is a diagram illustrated to describe a configuration example of a power supply system 1 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated description of these structural elements is omitted.

Moreover, the description will be given in the following order.
1. Embodiment of present disclosure
1.1. Background
1.2. Configuration example
1.3. Operation example
1.4. Display example
2. Summary
<1. Embodiment of Present Disclosure>
[1.1. Background]

A background pertaining to an embodiment of the present disclosure is described and then the embodiment of the present disclosure is described in detail.

As described above, there has been known an uninterruptible power supply device provided with a storage battery. Such interruptible power supply device is capable of supplying continuously power from the storage battery to equipment connected thereto for a predetermined time without causing power interruptions even when power from an input power source is cut off. Techniques have been developed for supplying power to customers in which such a power supply device is provided when an abnormality occurs in supplying power due to power interruption, shortage of storage battery capacity, or other reasons.

Techniques for storing power generated by what is called renewable energy such as sunlight, solar heat, hydropower, wind power, biomass, geothermal power, or other energy sources in a storage battery and for using the power stored in the storage battery have been developed.

As described above, the power supply system in which a battery server having such a storage battery capable of storing power generated by renewable energy is provided at premises such as a home has been developed. This power supply system interchanges direct-current power through a power line between the battery servers that are connected to each other by the power line and a communication line. The premises having the battery server provided therein are also referred to as "node" hereinafter.

In a case of interchanging direct-current power between nodes, in one example, the amount and price of power to be interchanged are negotiated between the nodes in advance. Then, when agreement is reached between the nodes, the direct-current power is interchanged through the power line under the agreement.

In the power supply system as described above, if the respective nodes perform the interchange of direct-current power separately, the voltage on the power line is likely to be unstable or the amount of power agreed in advance between the nodes is less likely to be transmitted correctly. Thus, it is important how to determine the interchange of direct-current power between the nodes. There is an approach that allows one node to manage all information including the amount and price of power for the interchange of direct-current power and to determine a target node to interchange direct-current power.

However, as the power supply system becomes popular and the number of nodes connected to the power line increases, it may be difficult for one node to manage all the information. Thus, it is desirable for a node connected to the power line to determine flexibly a target node to which direct-current power is transmitted or a target node from which direct-current power is received.

In view of the above-described background, those who conceived the present disclosure have conducted intensive studies to provide a technology for enabling effective determination of a counterpart as a target for interchange of direct-current power through a power line between nodes connected to the power line. Accordingly, those who conceived the present disclosure have developed the technology for enabling effective determination of a counterpart as a target for interchange of direct-current power through a power line on the basis of a power usage state at each node.

The background pertaining to an embodiment of the present disclosure is described above.

[1.2. Configuration Example]

Subsequently, an embodiment of the present disclosure is described in detail. A configuration example of a power supply system according to an embodiment of the present disclosure is first described.

FIG. 1 is a diagram illustrated to describe a configuration example of a power supply system 1 according to an embodiment of the present disclosure. The configuration example of the power supply system 1 according to an embodiment of the present disclosure is described below with reference to FIG. 1.

The power supply system 1 illustrated in FIG. 1 is a system in which direct-current power is interchanged through a power line between battery servers provided at premises such as a home. Each of the battery servers has a storage battery capable of storing power generated by renewable energy and the battery servers are connected with each other through the power line and a communication line.

FIG. 1 illustrates six nodes 100a to 100f that constitute the power supply system 1 and the respective nodes 100a to 100f are connected to a direct-current power line 10 and a communication line 20. The nodes 100a to 100f are premises, each having a storage battery capable of storing power generated by renewable energy. Each of the nodes 100a to 100f is a power usage unit that uses power stored in a battery server such as, in one example, home, school, government office, and hospital. Of course, the number of nodes that constitute the power supply system 1 is not limited to that illustrated in FIG. 1.

Each of the nodes 100a to 100f includes a generator and a storage battery. The generator is capable of generating power using what is called renewable energy such as sunlight, solar heat, hydropower, wind power, biomass, geothermal power, or other energy sources. The storage battery stores power generated by the generator. In addition, each of the nodes 100a to 100f is configured to be capable of interchanging power stored in the storage battery with the other ones of the nodes 100a to 100f through the direct-current power line 10. A specific configuration example of each of the nodes 100a to 100f will be described later in detail.

The nodes 100a to 100f are also simply referred to collectively as a node 100, hereinafter.

The node 100 participating in the power supply system 1 (i.e., being connected to the direct-current power line 10 and being in a state in which direct-current power can be exchanged with another node 100) can freely participate in or withdraw from the power supply system 1. The node 100, when wanting to exchange direct-current power with another node 100, participates in the power supply system 1. The node 100, when not wanting to exchanges direct-current power with another node 100, withdraws from the power supply system 1.

The direct-current power line 10 is a power line for distributing direct-current power to the respective nodes 100. In addition, the communication line 20 is a communication line for transmission of information between the respective nodes 100 on the basis of a predetermined protocol. Moreover, although the communication line 20 is illustrated as a wired line in FIG. 1, the information transmission between the nodes 100 may be performed wirelessly.

In one example, in the case where direct-current power is interchanged between the nodes 100 through the direct-current power line 10 in the power supply system 1 illustrated in FIG. 1, there is also an approach in which one of the nodes 100 (e.g., node 100a) manages all information as described above.

However, as described above, as the number of nodes 100 participating in the power supply system 1 (i.e., being connected to the direct-current power line 10) increases, it may be difficult for one of the nodes 100 to manage all the information.

Thus, it is desirable for the node 100 connected to the direct-current power line 10 to determine flexibly a target node 100 to which direct-current power is transmitted or a target node 100 from which direct-current power is received.

Thus, in the power supply system 1 according to the present embodiment, in the case where direct-current power is interchanged between the nodes 100 through the direct-current power line 10, the respective nodes 100 determine a target node 100 as a counterpart for interchanging direct-current power. The node 100 refers to a power usage state of each of the nodes 100 in determining the target node 100 as a counterpart for interchanging direct-current power.

In this manner, the node 100 participating in the power supply system 1 refers to the power usage state of other nodes 100 and determines a target node 100 as a counterpart for interchanging direct-current power. Thus, the participating node 100 can determine flexibly a target node 100 to which direct-current power is transmitted or a target node 100 from which direct-current power is received.

The configuration example of the power supply system 1 according to an embodiment of the present disclosure is described above with reference to FIG. 1. Subsequently, a functional configuration example of the node 100 participating in the power supply system 1 according to an embodiment of the present disclosure is described.

Figure 2:
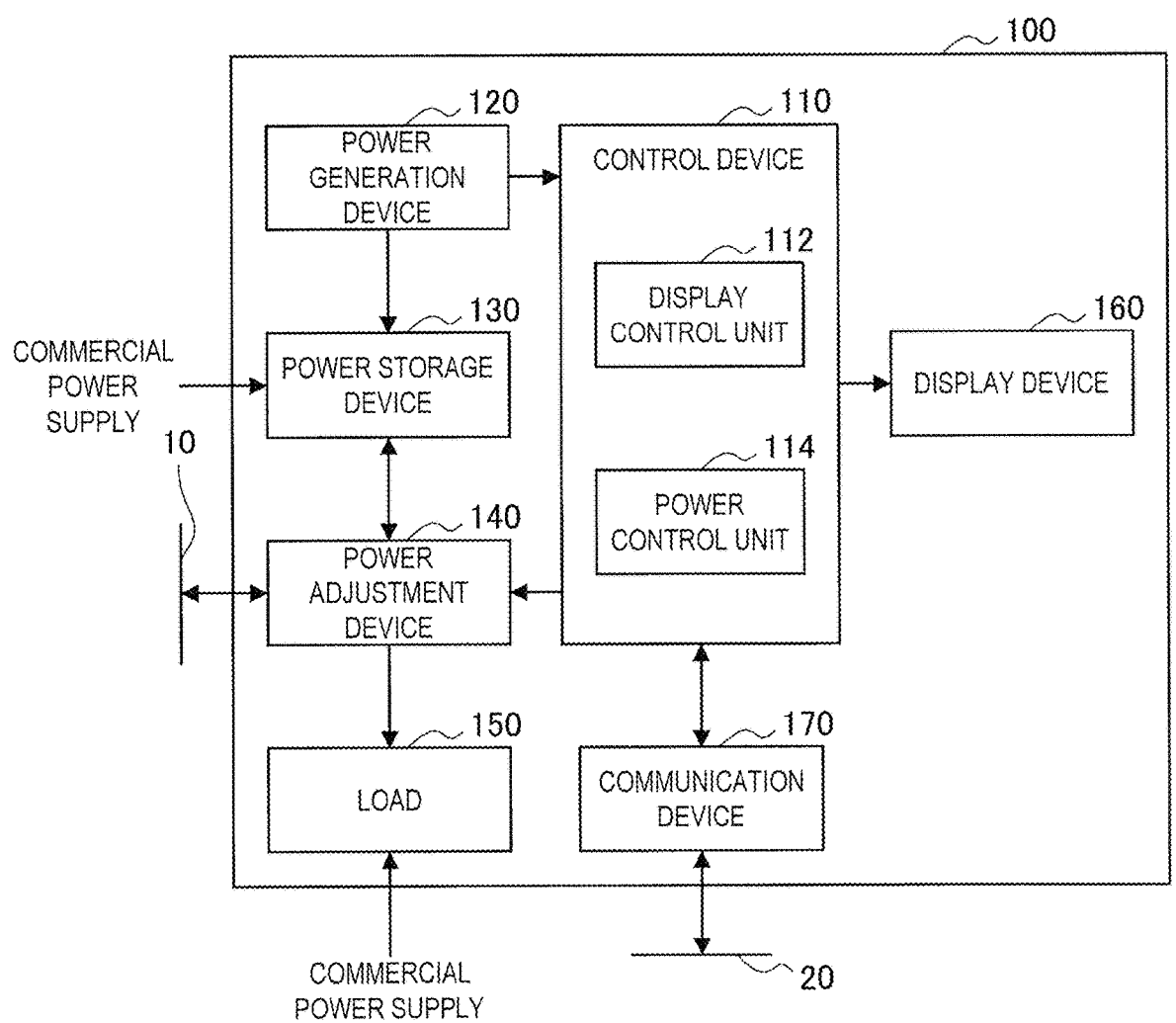
FIG. 2 is a diagram illustrated to describe a functional configuration example of a node 100 according to an embodiment of the present disclosure.

FIG. 2 is a diagram illustrated to describe a functional configuration example of the node 100 according to an embodiment of the present disclosure. The functional configuration example of the node 100 according to an embodiment of the present disclosure is described below with reference to FIG. 2.

As illustrated in FIG. 2, the node 100 according to an embodiment of the present disclosure is configured to include a control device 110, a power generation device 120, a power storage device 130, a power adjustment device 140, a load 150, a display device 160, and a communication device 170.

The control device 110 is a device that controls the operation of each of the devices included in the node 100. In the present embodiment, the control device 110 is configured to include the display control unit 112 and the power control unit 114.

The display control unit 112 controls display of information on the display device 160. In the present embodiment, the display control unit 112 controls the display device 160 so that the display device 160 displays information related to the power usage state of each of the nodes 100.

In the present embodiment, the information related to the power usage state of each of the nodes 100 is also referred to as "profile information". The profile information includes, in one example, information on the amount of power generated by the power generation device 120, information on the amount of power used by the load 150, information on the amount of power supplied to another node 100, and information on the amount of power received from another node 100.

The node 100 receives profile information of another node 100 through the communication device 170 from the other node 100. In addition, the node 100 transmits its own profile information to another node 100 through the communication device 170 as necessary.

There may be a case where all the profile information of the other node 100 is released. In this case, in one example, other people will get to know a time zone in which a person is present or a time zone in which a person is not present in the node 100 by the information on the amount of power used by the load 150, which is undesirable from the viewpoint of security.

Thus, the display control unit 112 controls so that the profile information of the other node is displayed on the display device 160 in a state in which some of the profile information is concealed from the viewpoint of privacy protection. In the present embodiment, in the case where the profile information includes the above-described information, the information on the amount of power generated from the power generation device 120 and the information on the amount of power used by the load 150 are concealed. On the other hand, the information on the amount of power supplied to the other node 100 and the information on the amount of power received from the other node 100 are revealed.

Moreover, in the case where an administrator of the power supply system 1 intends to view the information on the respective nodes 100, the display control unit 112 may set all the profile information 100 to be revealed for any of the nodes from the viewpoint of management of the system.

The power control unit 114 controls the exchange of direct-current power with the other node 100 through the direct-current power line 10. Specifically, the power control unit 114 selects a node 100 suitable for the exchange of power by using the profile information of each of the nodes 100. The power control unit 114 may select automatically the other node 100 suitable for the exchange of power by using the profile information of each of the nodes 100. Alternatively, the power control unit 114 may select the other node 100 on the basis of an instruction from the user of the node 100 who views the profile information of the other node 100 through the display device 160.

The power generation device 120 is a device that generates power using what is called renewable energy such as sunlight, solar heat, hydropower, wind power, biomass, geothermal power, or other energy sources. The power generated by the power generation device 120 is stored in the power storage device 130. The power generation device 120 outputs the information related to the generated power amount to the control device 110 as necessary.

The power storage device 130 includes a rechargeable battery that can be charged and discharged. The power storage device 130 stores power generated by the power generation device 120. The power storage device 130 supplies power stored through the power adjustment device 140 to the load 150 or supplies power to the direct-current power line 10. The power storage device 130 may be configured to store the direct-current power supplied from the other node 100 through the direct-current power line 10 or the power from a commercial power supply generated by a power plant of a power company, in addition to the power generated by the power generation device 120. The power storage device 130 outputs the information related to the stored power amount to the control device 110 as necessary.

The power adjustment device 140 is configured to include, in one example, a DC-to-DC converter. In one example, the power adjustment device 140, when outputting the power stored in the power storage device 130 to the direct-current power line 10 or the load 150 or when receiving the direct-current power supplied from the other node 100 through the direct-current power line 10, has a function of adjusting the voltage or current. The power control unit 114 controls the voltage or current of the power adjustment unit 140.

The load 150 is a device that operates upon receipt of power. In other words, any device operating upon supply of power can be the load 150. The load 150 may operate with power stored in the power storage device 130 or may operate with power from a commercial power supply generated by a power plant of a power company.

The display device 160 is a device that displays information, and is, in one example, a device provided with a liquid crystal display panel or an organic EL display panel. In the present embodiment, the display device 160 displays information under the control of the display control unit 112.

In the present embodiment, the display device 160 displays information related to the power usage state of each of the nodes 100 based on the profile information of each of the nodes 100. The display device 160, when displaying the information related to the power usage state of each of the nodes 100 based on the profile information of each of the nodes 100, displays all the profile information of its own node 100 under the control of the display control unit 112. On the other hand, the display device 160, when displaying information related to the power usage state of each of the nodes 100 based on the profile information of each of the nodes 100, displays the profile information in a state where some of the profile information are concealed for the other node 100 under the control of the display control unit 112.

The communication device 170 is a device that performs transmission or reception of information from or to the other node 100 through the communication line 20 on the basis of a predetermined protocol. The communication device 170 performs, in one example, the transmission or reception of the profile information to or from the other node 100 under the control of the control device 110.

The functional configuration example of the node 100 according to an embodiment of the present disclosure is described above with reference to FIG. 2. Subsequently, an operation example of the node 100 according to an embodiment of the present disclosure is described.

[1.3. Operation Example]

Figure 3:
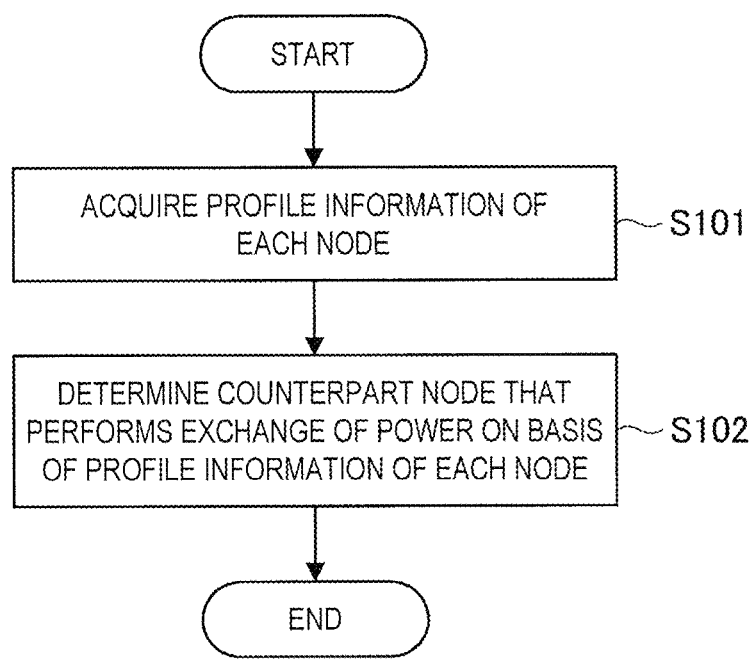
FIG. 3 is a flowchart illustrating an operation example of the node 100 according to an embodiment of the present disclosure.

FIG. 3 is a flowchart illustrating an operation example of the node 100 according to an embodiment of the present disclosure. FIG. 3 illustrates an example of operation when the node 100 determines another node 100 that performs exchange of direct-current power. The operation example of the node 100 according to an embodiment of the present disclosure is described below with reference to FIG. 3.

The node 100 acquires profile information of each of the nodes 100 to determine another node 100 that performs exchange of direct-current power (step S101). The processing of acquiring the profile information of each of the nodes 100 is executed, in one example, by the power control unit 114 receiving the profile information from the other node 100 through the communication device 170.

If the profile information of each of the nodes 100 is acquired in step S101, then the node 100 determines the other node 100 that performs exchange of direct-current power on the basis of the acquired profile information (step S102). The processing of step S102 is executed, in one example, by the power control unit 114.

The other node 100 that performs exchange of direct-current power may be selected automatically as a node that is appropriate for exchange of power using the profile information of each of the nodes 100. Alternatively, the other node 100 may be selected on the basis of an instruction by the user of the node 100 who views the profile information of the other node 100 displayed on the display device 160.

The operation example of the node 100 according to an embodiment of the present disclosure is described above with reference to FIG. 3. Subsequently, an example of information displayed on the display device 160 in the node 100 according to an embodiment of the present disclosure is described.

[1.4. Display Example]

FIGS. 4 to 14 are diagrams illustrated to describe an example of information displayed on the display device 160 in the node 100 according to an embodiment of the present disclosure. The information displayed on the display device 160 in the node 100 according to an embodiment of the present disclosure is described below in order.

Figure 4:
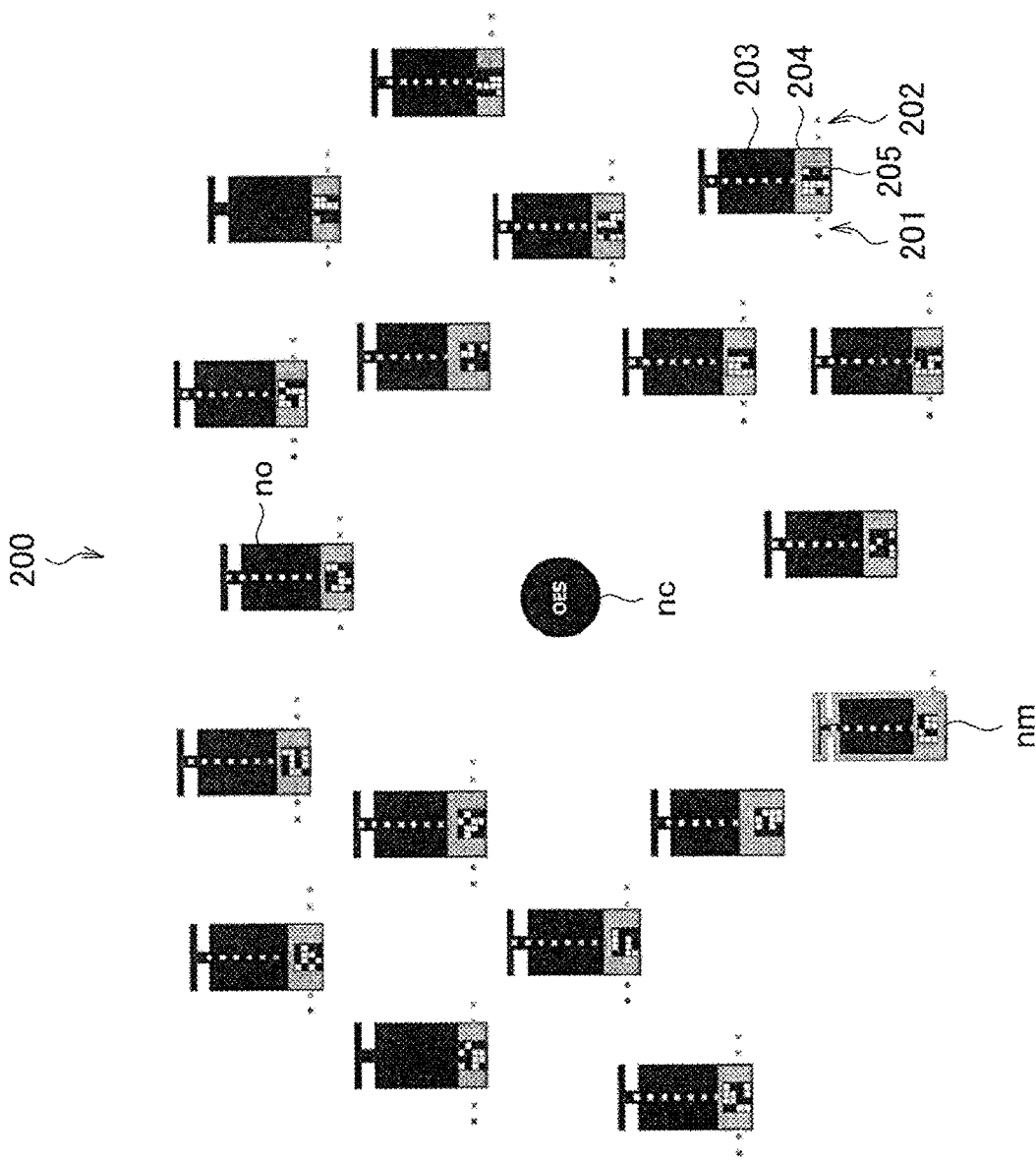
FIG. 4 is a diagram illustrated to describe an example of information displayed on a display device 160 by the node 100 according to an embodiment of the present disclosure.

FIG. 4 is an example of information 200 about how the node 100 participates in the power supply system 1 according to an embodiment of the present disclosure, which is one of the information displayed on the display device 160 in the node 100 according to an embodiment of the present disclosure. The information 200 illustrated in FIG. 4 is displayed on the display device 160 by the display control unit 112.

The information 200 illustrated in FIG. 4 includes an icon, nm, indicating the own node 100, an icon, no, indicating the other node 100, and an icon, nc, indicating a (virtual) central node. The "OES" of the icon, nc, means "Open Energy System", and is a distributed and dynamically reconfigurable system such as the power supply system 1 according to an embodiment of the present disclosure.

As described above, the node 100 participating in the power supply system 1 (i.e., being connected to the direct-current power line 10) can freely participate and withdraw. When a new node 100 participates in the power supply system 1, the display control unit 112 causes a new icon to be displayed in response to the participation. When the node 100 withdraws from the power supply system 1, a relevant icon is caused to be erased in response to the withdrawal.

The processing of participation in the power supply system 1 and withdrawal from the power supply system 1 is not limited to particular processing. In one example, the node 100, when participating in the power supply system 1, broadcasts an event of participating in the power supply system 1 through the communication device 170, and periodically broadcasts information. When the node 100 withdraws from the power supply system 1, there is no information to be broadcast periodically, and thus it can be seen that the node 100 has withdrawn from the power supply system 1.

The icon, nm, indicating the own node 100 is surrounded with a frame having a predetermined thickness to distinguish it from the icon, no, indicating the other node 100. On the left side of the icons, nm and no, indicating the respective nodes, information 201 indicating how to supply power from the commercial power supply to the node 100 is displayed. The frame having a predetermined thickness displayed in the icon, nm, indicating the own node 100 may be displayed constantly, or may be displayed when the user performs an operation such as placing a mouse cursor on the icon, nm.

On the right side of the icons, nm and no, indicating the respective nodes 100, information 202 indicating how to output power (e.g., being used by the load 150) from the node 100 is displayed. The information 201 is displayed such that dots of a predetermined size are directed toward the icons, nm and no, indicating the respective nodes 100. In addition, the information 202 is displayed such that dots of a predetermined size go out from the icons, nm and no, indicating the respective nodes 100.

In the icons, nm and no, indicating the respective nodes 100, information 203 indicating the state of the power generated by the power generation device 120 and supplied to the power storage device 130 is displayed. The information 201 is displayed such that dots of a predetermined size fall inside the icons, nm and no, indicating the respective nodes 100.

In the icons, nm and no, indicating the respective nodes, information 204 indicating the amount of power stored in the power storage device 130 is displayed. In addition, in the icons, nm and no, indicating the respective nodes 100, information 205 used to uniquely identify the node 100 participating in the power supply system 1 according to an embodiment of the present disclosure is displayed. In the present embodiment, the information 205 is one in which dots of a predetermined size are arranged in a range of four in the vertical direction and four in the horizontal direction on the basis of a predetermined rule. In addition, the information 205 is arranged on the basis of a rule such that two or more of the dots of a predetermined size are displayed in different ways independently of each other.

In a case where the node 100 is one used by the user, when the icon, nm, is selected by a predetermined operation such as operation of a mouse, operation to a touch panel, or voice input, the user can view completely the profile information of the node 100 corresponding to the icon, nm. On the other hand, if the same user selects the icon, no, by the predetermined operation described above, the same user can view the profile information of the node 100 corresponding to the icon, no, in a state in which some of the profile information is hidden.

Moreover, the information items indicating the respective nodes 100 may be arranged, at the time of initial display, randomly at the center of the icon, nc, and at equal intervals as much as possible.

Figure 5:
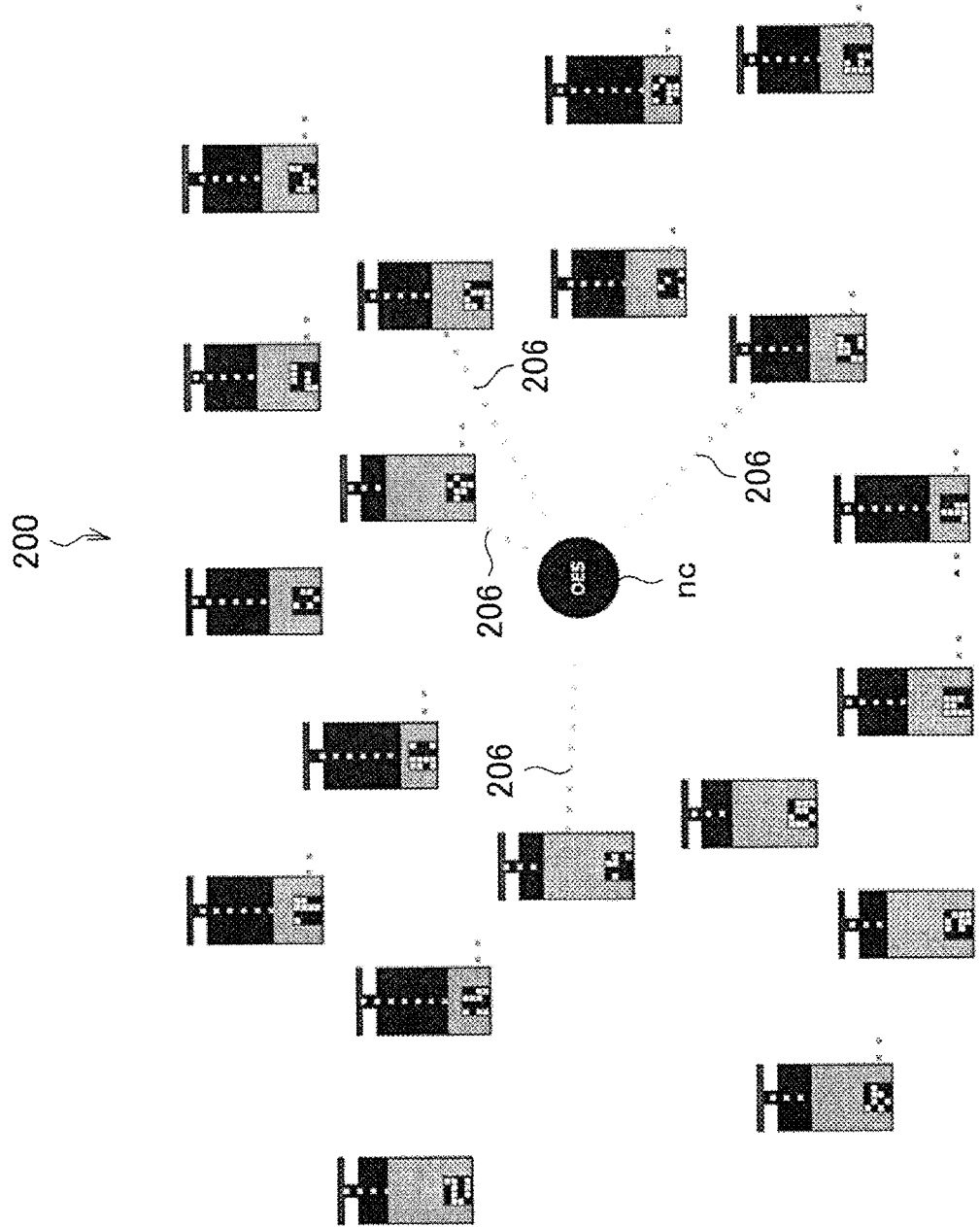
FIG. 5 is a diagram illustrated to describe an example of information displayed on a display device 160 by the node 100 according to an embodiment of the present disclosure.

FIG. 5 is an example of information 200 about how the node 100 participates in the power supply system 1 according to an embodiment of the present disclosure, which is one of the information displayed by the node 100 according to an embodiment of the present disclosure on the display device 160. The information 200 illustrated in FIG. 5 indicates how to perform the exchange of direct-current power between the nodes 100.

In the state in which the exchange of direct-current power are performed between the nodes 100, information 206 in which dots of a predetermined size are moved from the supply source of the direct-current power to the supply destination via the icon, nc, indicating the (virtual) central node is displayed. The direct-current power does not actually pass through a particular node, but is displayed such that direct-current power flows through the icon, nc, indicating the central node as illustrated in FIG. 5, and thus it is possible to view the flow of direct-current power in a visually easy-to-understand manner.

During the exchange of direct-current power between the nodes 100, the information indicating the respective nodes 100 may be displayed such that it gradually approaches the icon, nc, indicating the central node. Such display of the information indicating the respective nodes 100 such that it gradually approaches the icon, nc, indicating the central node during the exchange of direct-current power between the nodes 100 can be performed. This makes it possible to know that an approach to the icon, nc, indicating the central node indicates that the exchange of direct-current power is performed and to know that going away from the icon, nc, indicating the central node indicates that the exchange of direct-current power is not performed.

In this way, the display of the information on the display device 160 by the display control unit 112 makes it possible to present the state of the node 100 participating in the power supply system 1 according to an embodiment of the present disclosure in a visually easy-to-understand manner. In addition, the display of the information on the display device 160 by the display control unit 112 makes it possible to protect privacy of the respective nodes 100.

In this way, the display of the information on the display device 160 by the display control unit 112 makes it possible for the user to instruct intuitively to perform the exchange of direct-current power between the nodes 100. In one example, the user can move the icon, nm, indicating the own node 100 to the icon, no, indicating the other node 100 by performing a drag operation on the mouse or the touch panel. This allows an offer to exchange the direct-current power between the own node 100 and the other node 100 to be performed.

Figure 6:
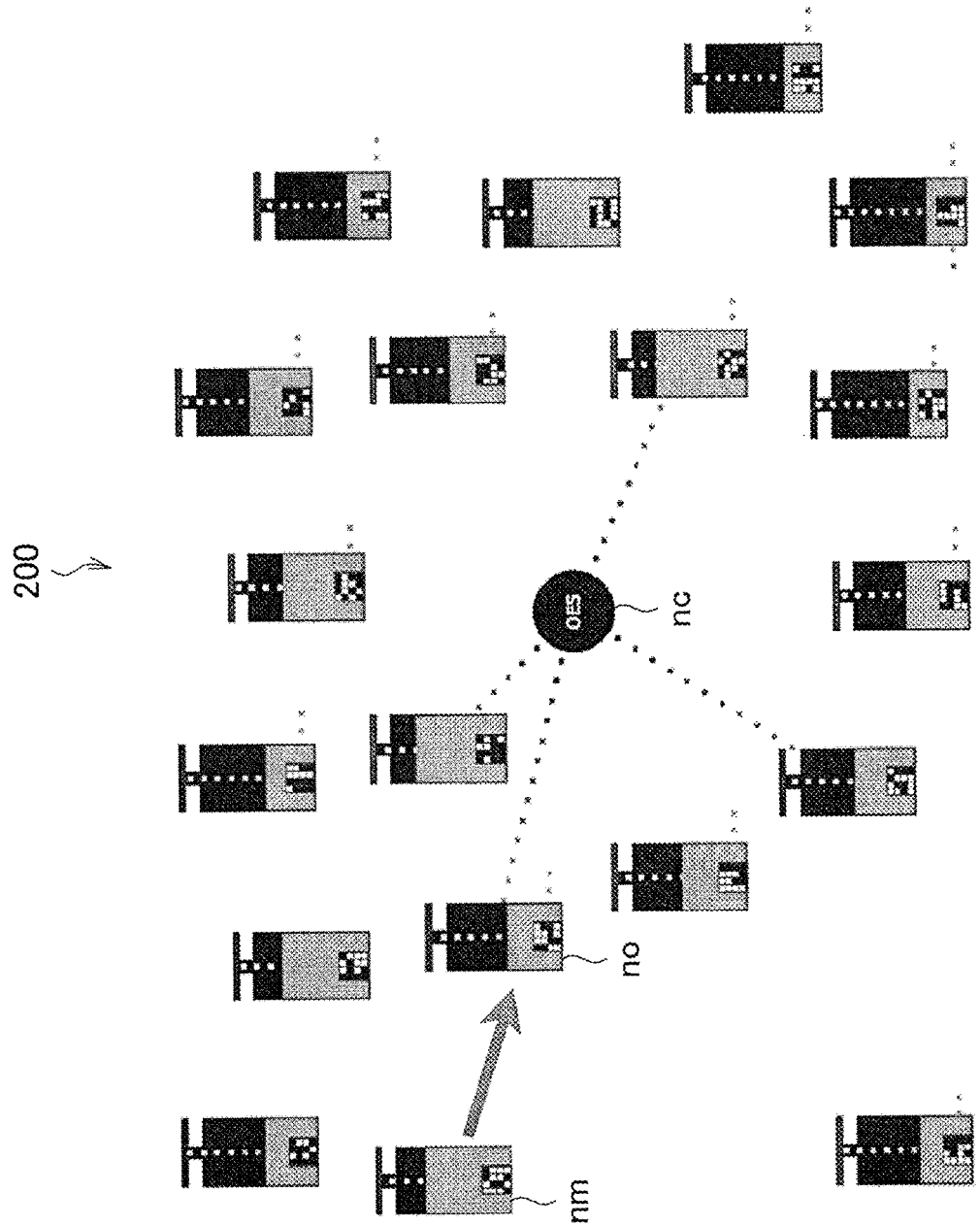
FIG. 6 is a diagram illustrated to describe an example of information displayed on a display device 160 by the node 100 according to an embodiment of the present disclosure.
Figure 7:
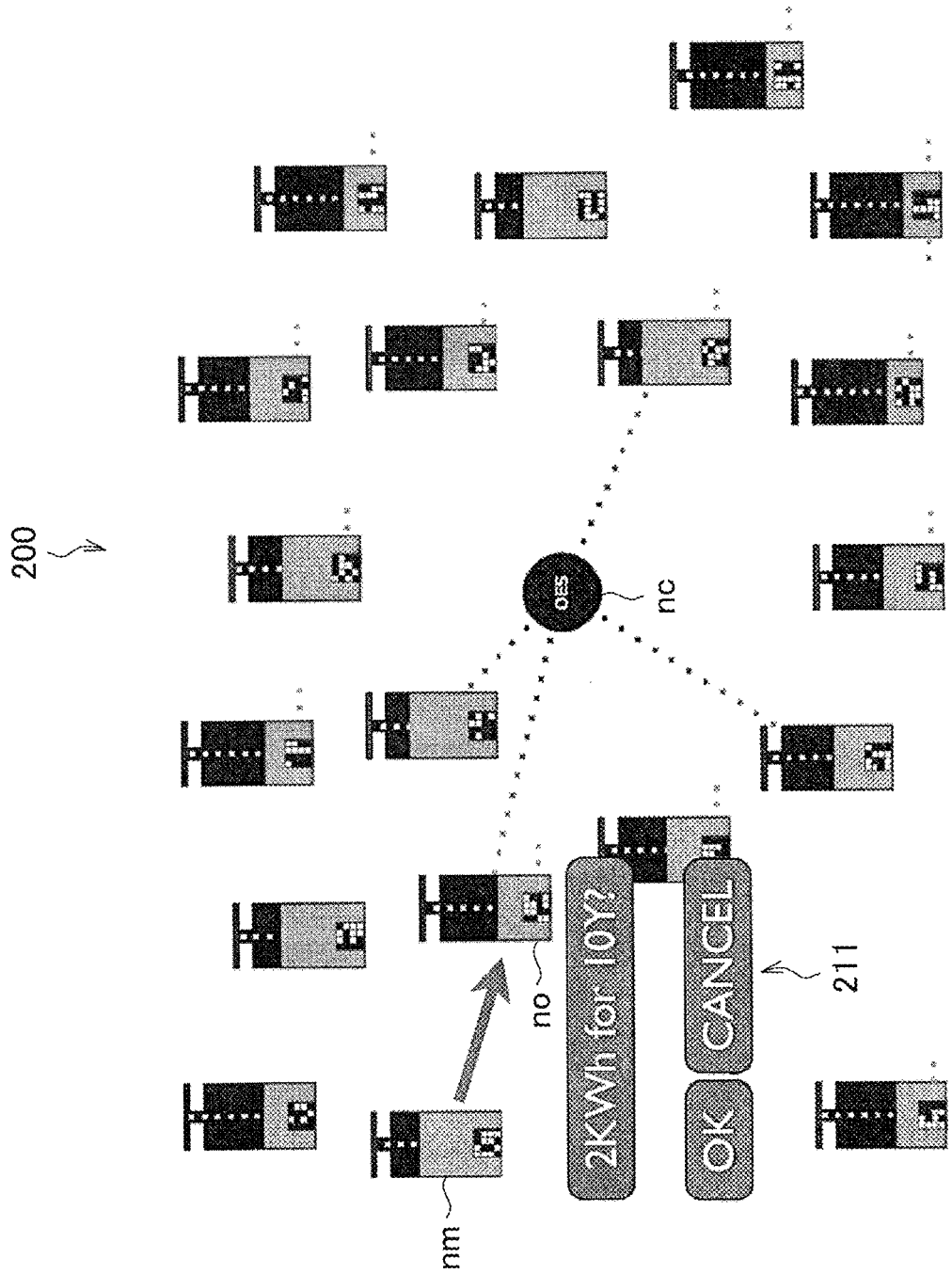
FIG. 7 is a diagram illustrated to describe an example of information displayed on a display device 160 by the node 100 according to an embodiment of the present disclosure.

FIG. 6 is a diagram illustrated to describe how the icon, nm, indicating the own node 100 is moved to the icon, no, indicating the other node 100 by performing a drag operation on the mouse or the touch panel. FIG. 7 is a diagram illustrated to describe how information 211 related to the offer to exchange the direct-current power between the own node 100 and the other node 100 is displayed.

When the icon, nm, is moved toward the icon, no, by the user's drag operation as illustrated in FIG. 6, the information 211 indicating a condition of the exchange of direct-current power from the own node 100 to the other node 100 is displayed as illustrated in FIG. 7. On the other hand, when the icon, no, is moved toward the icon, nm, by the user's drag operation, information indicating a condition of the exchange of direct-current power from the other node 100 to the own node 100 is displayed.

In one example, FIG. 7 illustrates that there are an offer to transmit direct-current power from the own node 100 to the other node 100 and a response to accept the direct-current power on condition that the price is 10 yen at 2 kWh from the other node 100. If this condition is accepted, "OK" is selected. If this condition is not accepted, "CANCEL" is selected.

Figure 8:
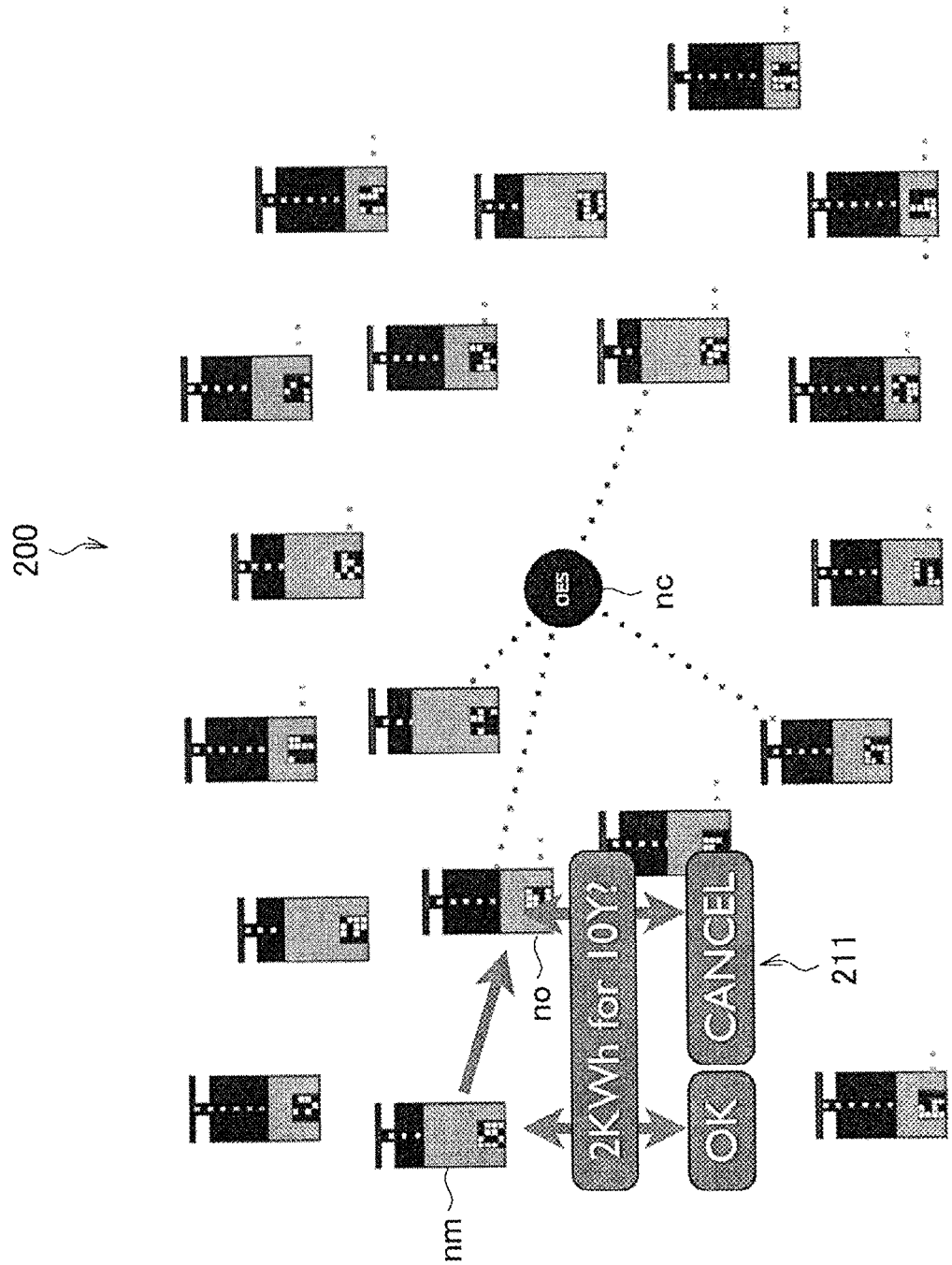
FIG. 8 is a diagram illustrated to describe an example of information displayed on a display device 160 by the node 100 according to an embodiment of the present disclosure.

The user can freely select the amount of power to be exchanged and the power rates. FIG. 8 is a diagram illustrated to describe how the information 211 related to an offer for the exchange of direct-current power between the own node 100 and the other node 100 is displayed. In FIG. 8, an arrow used for the user to select the amount of power to be exchanged and the power rates is displayed, and the user can change the amount of power and the power rates for an offer to perform the exchange of direct-current power by performing an operation on the arrow.

Figure 9:
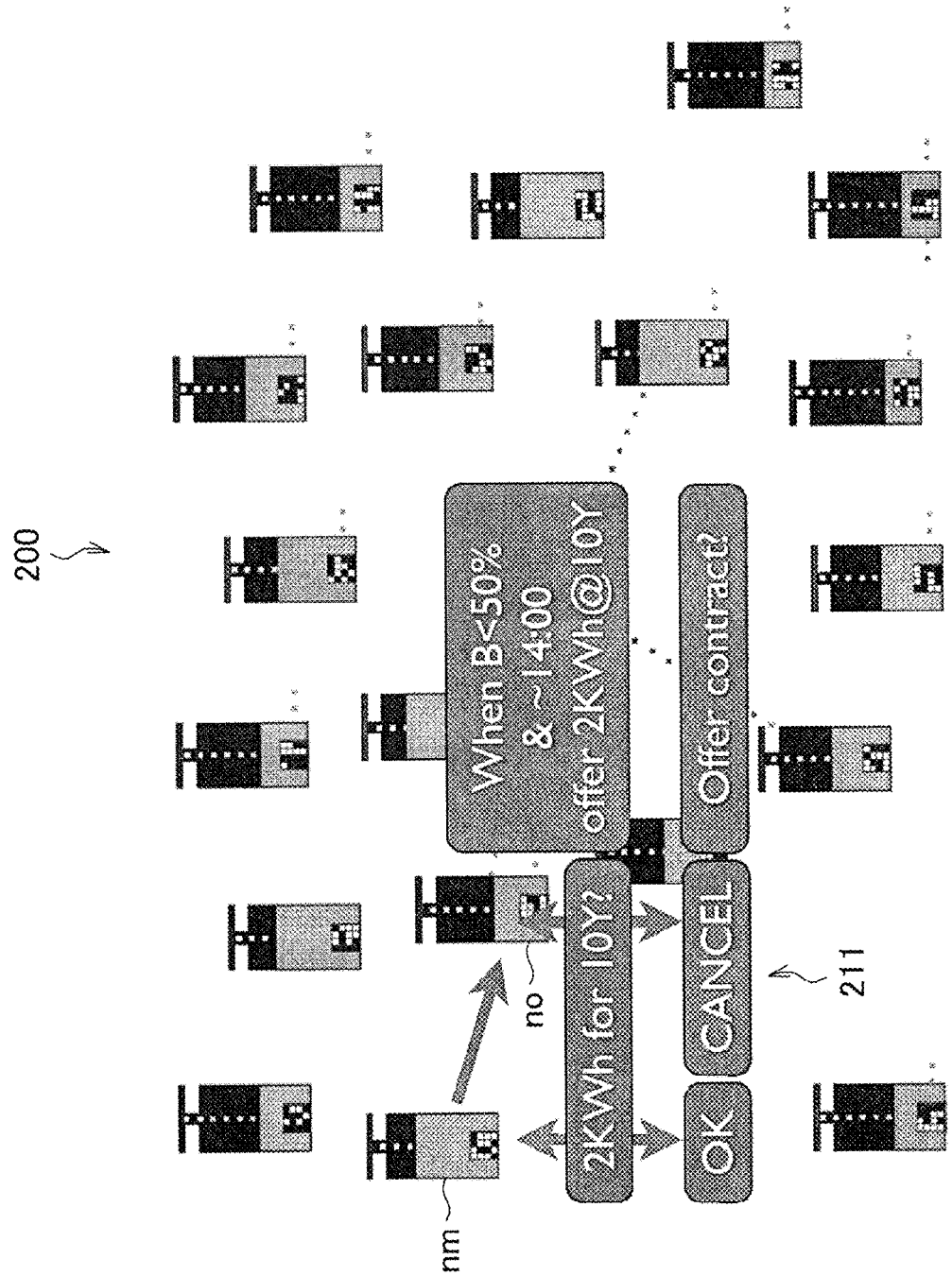
FIG. 9 is a diagram illustrated to describe an example of information displayed on a display device 160 by the node 100 according to an embodiment of the present disclosure.

The power control unit 114 can make a recommendation related to the exchange of direct-current power with the other node 100 by referring to the profile information of the node. The display control unit 112 may cause the display device 160 to display information on the recommendation related to the exchange of direct-current power from the power control unit 114. FIG. 9 is a diagram illustrated to describe how the information 211 on the recommendation related to the exchange of direct-current power from the power control unit 114 is displayed.

FIG. 9 illustrates how to display a condition that "direct-current power is supplied from the other node 100 on condition that the price is 10 yen at 2 kWh in a case where battery remaining capacity is less than 50% and available time is until 2 pm". This condition is used as information on the recommendation related to the exchange of direct-current power from the power control unit 114. When the user accepts the condition presented to the user from the power control unit 114, the user performs an operation of selecting "Offer contract?" displayed on the display device 160 by the display control unit 112.

As described above, the privacy of other node 100 is necessary to be protected. However, when the exchange of direct-current power is offered, it is desirable to reveal information related to the usage state of power to some extent. Thus, the display control unit 112 can cause information related to the previously used power from the profile information to be displayed.

Figure 10:
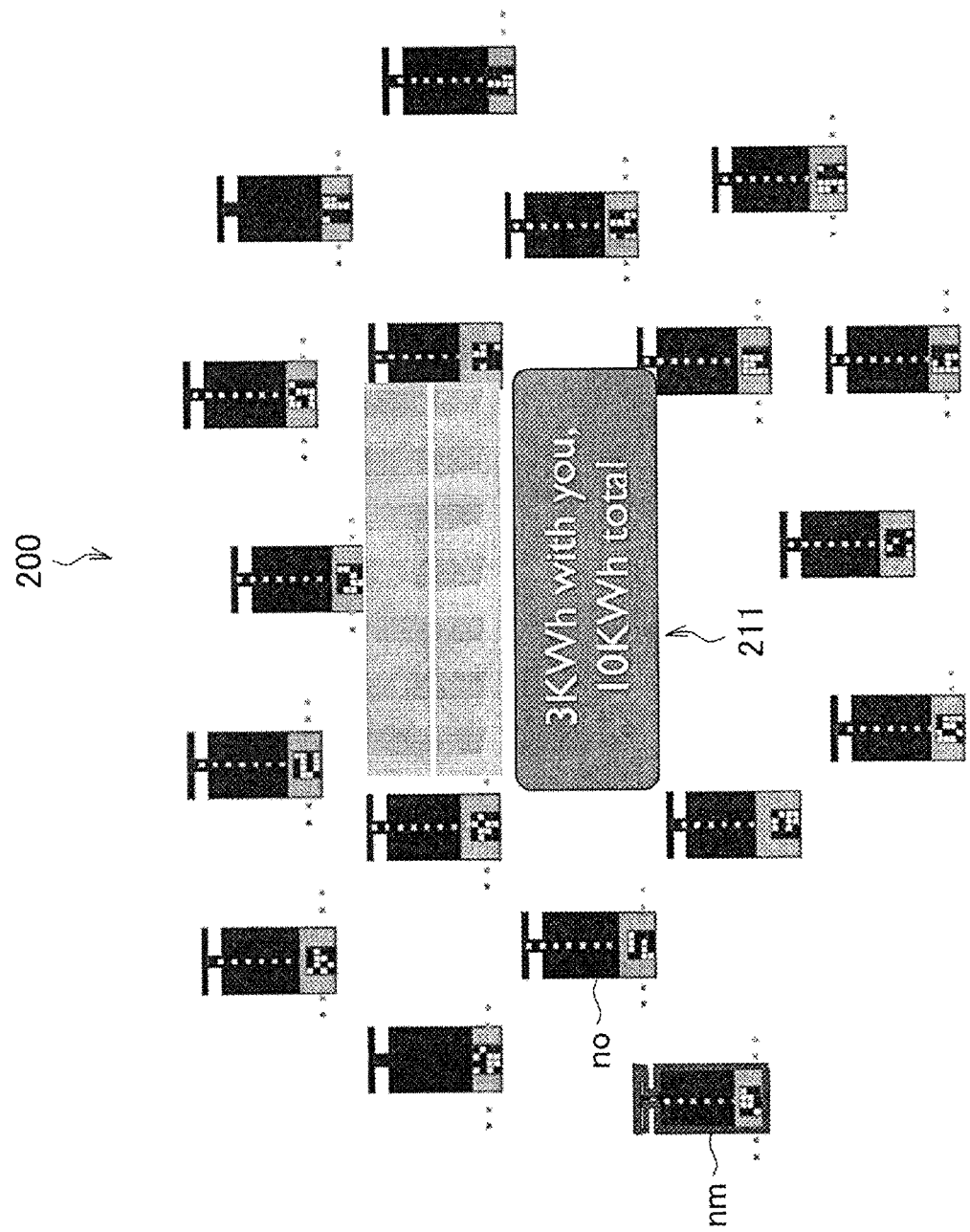
FIG. 10 is a diagram illustrated to describe an example of information displayed on a display device 160 by the node 100 according to an embodiment of the present disclosure.

FIG. 10 illustrates how to display information 212 related to the previously (e.g., for the past week) used power from the profile information in the other node 100. FIG. 10 illustrates how to display information related to the exchange of direct-current power performed previously in the other node 100 and the information related to the previous charging state of the power storage device 130 in the other node 100, as the information 212 related to the previously used power. In addition, FIG. 10 illustrates how to display the information 212 indicating that the other node 100 performs previously the exchange of direct-current power of 3 kWh with the own node 100 and the entire power supply system 1 performs previously the exchange of direct-current power of 10 kWh.

Referring to the information 212 illustrated in FIG. 10, detailed usage state of power in the other node 100 is not clear. However, it can be seen that the other node 100 has a relatively low charge rate of the power storage device 130 in the morning, but has an increasing charge rate of the power storage device 130 in the afternoon. Thus, the reference to the information 212 by the power control unit 114 makes it possible to request the other node 100 to transmit direct-current power in the afternoon or to suggest that the direct-current power is supplied to the other node 100 in the morning.

Moreover, FIG. 10 illustrates an example in which the information related to the exchange of direct-current power performed previously in the other node 100 and the information related to the previous charging state of the power storage device 130 in the other node 100 are displayed as the information 212 related to the previously used power. However, the information to be displayed as the information 212 related to the previously used power may be any one of the information related to the exchange of direct-current power performed previously in the other node 100 and the information related to the previous charging state of the power storage device 130 in the other node 100.

Figure 11:
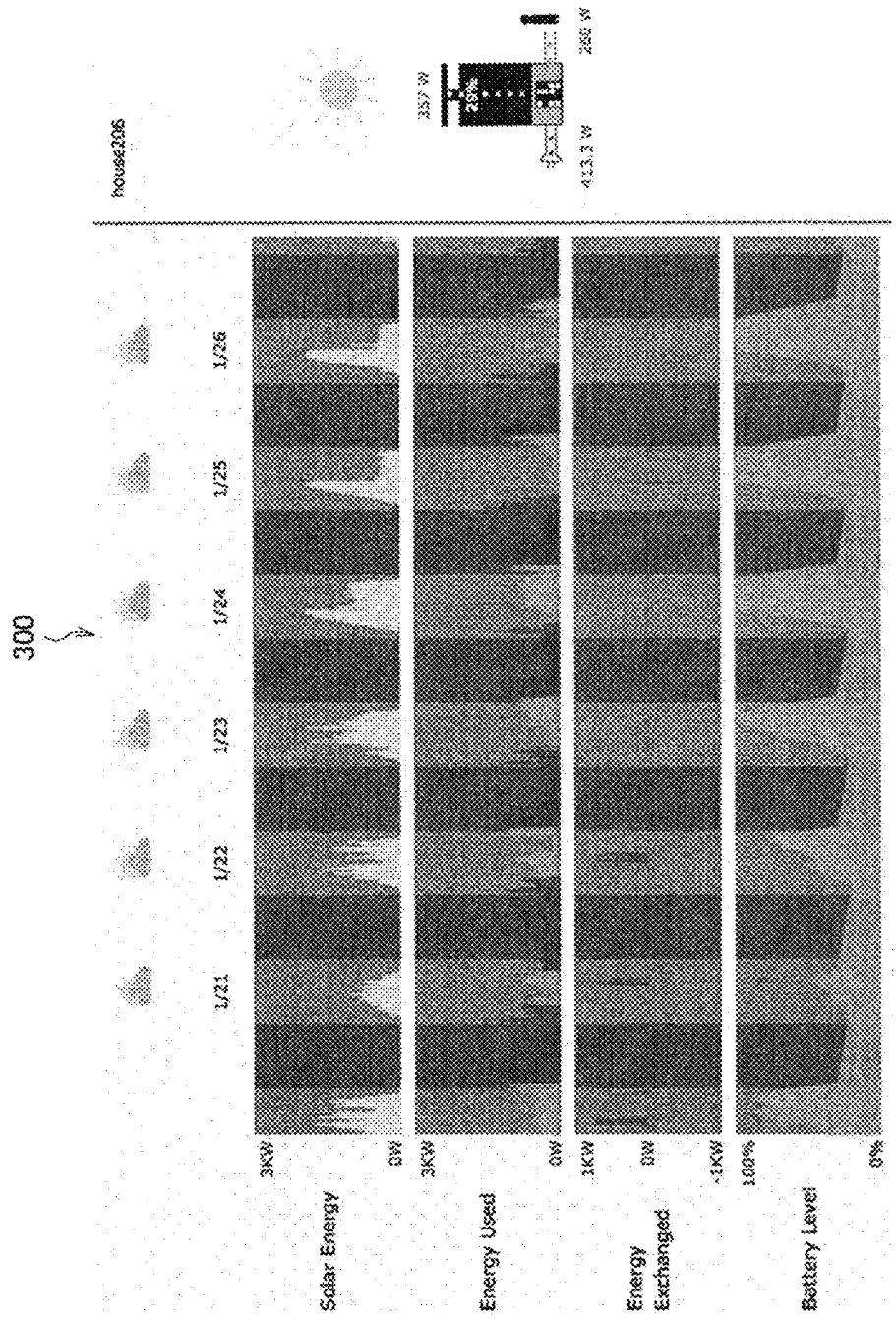
FIG. 11 is a diagram illustrated to describe an example of information displayed on a display device 160 by the node 100 according to an embodiment of the present disclosure.

The display control unit 112 can cause the display device 160 to display the profile information in detail for the own node 100. FIG. 11 is a diagram illustrated to describe how to display profile information 300 for the own node 100 on the display device 160.

The profile information 300 for the own node 100 includes the past weather, the power generation state of the power generation device 120, the power usage state by the load 150, the state of exchange of direct-current power with other node 100, and the state of power stored in the power storage device 130, as illustrated in FIG. 11. The power stored in the power storage device 130 is expressed in percentage.

Further, the profile information 300 related on the own node 100 includes the power generation amount (357 W in the example of FIG. 11) of the power generation device 120 in real time, the state of power stored in the power storage device 130 (29% in the example of FIG. 11), the amount of power supplied from the power company (413.3 W in the example of FIG. 11), and the power consumption by the load 150 (260 W in the example of FIG. 11).

In this way, the display control unit 112 causes the display device 160 to display the profile information in detail for the own node 100, but it causes the display device 160 to display only some of the profile information for the other node 100.

The power control unit 114 may automatically select a node that has satisfactory compatibility in exchanging the direct-current power using the profile information.

Figure 12:
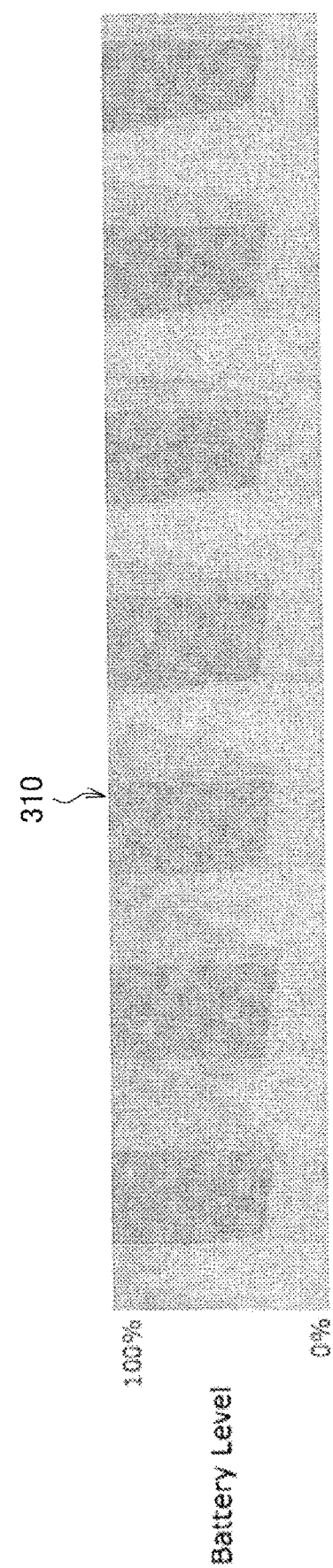
FIG. 12 is a diagram illustrated to describe an example of information displayed on a display device 160 by the node 100 according to an embodiment of the present disclosure.
Figure 13:
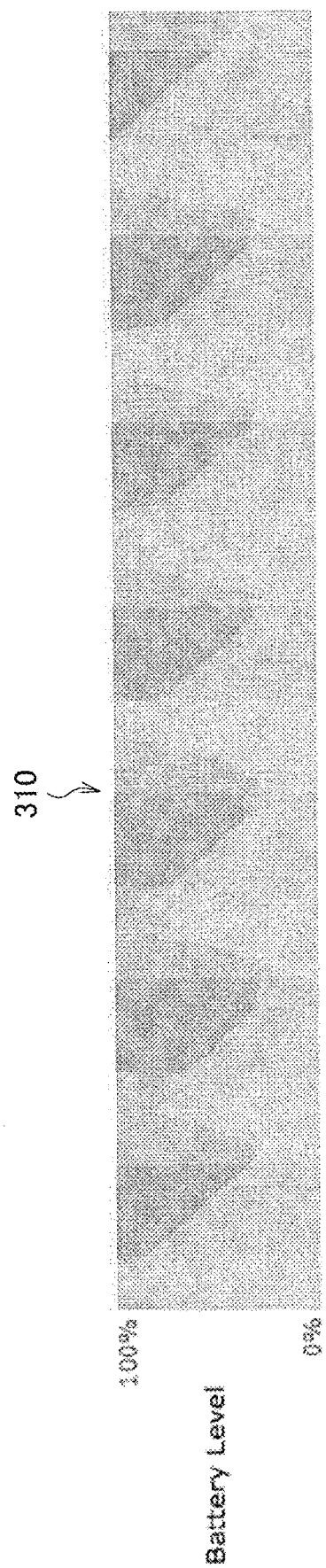
FIG. 13 is a diagram illustrated to describe an example of information displayed on a display device 160 by the node 100 according to an embodiment of the present disclosure.

FIGS. 12 and 13 illustrate information 310 indicating the state of transition of the power stored in the power storage device 130, which is included in profile information of a certain node 100. In one example, it is assumed to be known from the information 310 that the own node 100 uses the power stored in the power storage device 130 more frequently during the daytime and the other node 100 uses the power stored in the power storage device 130 more frequently during the night. The information 310 indicates the state of transition of the power stored in the power storage device 130 and is included in the profile information.

In this case, when the own node 100 supplies direct-current power to the other node 100 during the night and receives direct-current power from the other node 100 during the daytime, efficient exchange of the direct-current power with each other can be achieved.

Thus, the power control unit 114 of the own node 100 determines to supply the direct-current power to the other node 100 during the night and to receive the direct-current power from the other node 100 during the daytime, and offers the exchange of direct-current power to the node 100. When the other node 100 accepts the offer, the direct-current power is exchanged between the own node 100 and the other node 100 on the basis of the agreed condition.

The display control unit 112 may cause the display device 160 to display a level of satisfactory compatibility calculated by the power control unit 114 when the power control unit 114 determines a node having satisfactory compatibility in exchanging the direct-current power.

FIG. 14 illustrates how the display control unit 112 causes the display device 160 to display a satisfaction level of compatibility calculated by the power control unit 114 when the power control unit 114 determines a node having satisfactory compatibility in exchanging the direct-current power. FIG. 14 illustrates how the satisfaction level of compatibility with the own node 100 is indicated by enclosing it with a frame having a predetermined color around icons no1, no2, no3, and no4 indicating the respective nodes.

The display control unit 112 may represent the satisfaction level of compatibility, in one example, by the difference in color intensity in similar colors. In other words, the display control unit 112 may make the color of the frame darker if the compatibility is satisfactory, may make the color of the frame lighter if the compatibility is unsatisfactory, or does not necessarily display the frame.

The user can view the information related to the compatibility of the exchange of direct-current power displayed by the display control unit 112. This makes it possible to offer the exchange of direct-current power with the node 100 determined as having satisfactory compatibility in exchanging direct-current power by the power control unit 114.

The power control unit 114 may calculate the satisfaction level of compatibility in exchanging direct-current power, in one example, on the basis of the information 310 indicating the state of transition of the power stored in the power storage device 130. In one example, there may be a case where the own node 100 uses the power stored in the power storage device 130 more frequently during the daytime. In this case, the power control unit 114 may calculate that the compatibility in exchanging direct-current power with the node 100 using the power stored in the power storage device 130 more frequently during the daytime is unsatisfactory. Alternatively, the power control unit 114 may calculate that the compatibility in exchanging direct-current power with the node 100 using the power stored in the power storage device 130 more frequently during the night is satisfactory.

Further, the power control unit 114 may determine the satisfaction level of compatibility in exchanging direct-current power depending on the distance to the icon, nc, indicating the central node illustrated in FIG. 4 or other drawings. In one example, it is considered that the node 100 corresponding to the information closer to the icon, nc, exchanges direct-current power more frequently with the other node 100. It is considered that the node 100 corresponding to the information further away from the icon, nc, rarely exchanges direct-current power with the other node. Thus, the power control unit 114 may calculate that the node 100 corresponding to the information further away from the icon, nc, has satisfactory compatibility in exchanging direct-current power.

Further, the power control unit 114 may determine the satisfaction level of compatibility in exchanging direct-current power on the basis of an offer from the respective nodes 100. In one example, in a case where there is a purchase offer at 8 yen per 1 kWh from a certain node 100, and there is a purchase offer at 10 yen per 1 kWh from another certain node 100, the power control unit 114 may calculate that the latter node 100 has satisfactory compatibility in exchanging direct-current power.

Further, the power control unit 114 may determine a schedule of the exchange of direct-current power between the own node 100 and the other node 100 on the basis of a history of the previous exchange of direct-current power included in the profile information. In one example, there is a case where it is known that the exchange of direct-current power between the own node 100 and the other node 100 was performed every Sunday afternoon for three weeks straight by referring to the profile information. In this case, the power control unit 114 may determine to perform the exchange of direct-current power between the own node 100 and the other node 100 every Sunday afternoon.

Moreover, although the information illustrated in FIGS. 4 to 14 is described as being displayed on the display device 160 of the node 100 according to an embodiment of the present disclosure, the present disclosure is not limited to this example. In one example, the information illustrated in FIGS. 4 to 14 may be displayed on a terminal used by an administrator who manages the power supply system 1 according to an embodiment of the present disclosure.

The terminal used by an administrator who manages the power supply system 1 described above is not necessary to be connected to the communication line 20, but may be in a state capable of communicating with a certain node 100 participating in the power supply system 1. Alternatively, in one example, the terminal may be in a state capable of communicating with a server device connected to the communication line 20 of the power supply system 1. Moreover, the server device may perform the exchange of direct-current power with the node 100 or does not necessarily perform the exchange of direct-current power.

<2. Summary>

As described above, according to an embodiment of the present disclosure, the control device 110 capable of displaying the profile information of the respective nodes 100 participating in the power supply system 1 is provided. The control device 100 according to an embodiment of the present disclosure causes all the profile information to be displayed for the own node 100 and some of the profile information to be displayed for the other node 100.

As described above, the control device 110 according to an embodiment of the present disclosure displays all the profile information for its own node 100 and displays some of the profile information for the other nodes 100, so that privacy of the other node 100 can be protected.

Further, the control device 110 according to an embodiment of the present disclosure determines a node 100 that allows direct-current power to be interchanged on the basis of the profile information of the respective nodes 100 participating in the power supply system 1. In addition, in determining the node 100 that allows direct-current power to be interchanged, the control device 110 according to an embodiment of the present disclosure may automatically determine a node having satisfactory compatibility in interchanging direct-current power or may determine the node on the basis of the user's operation.

Steps in processes executed by the respective devices in this specification are not necessarily executed chronologically in the order described in the sequence chart or the flow chart. In one example, steps in processes executed by the respective devices may be executed in a different order from the order described in the flow chart or may be executed in parallel.

Further, a computer program for causing hardware such as a CPU, ROM, or RAM, incorporated in the respective devices, to execute a function equivalent to each configuration of the above-described respective devices. Furthermore, it is possible to provide a recording medium having the computer program recorded thereon. In addition, the respective functional blocks illustrated in the functional block diagram can be configured as hardware or hardware circuits, and thus a series of processing can be implemented using the hardware or hardware circuits.

In addition, a part or all of the respective functional blocks illustrated in the functional block diagrams in the above description may be implemented by a server device connected via a network such as the Internet, in one example. In addition, the configuration of the respective functional block illustrated in the functional block diagrams in the above description may be implemented by a single device or may be implemented by a system in which a plurality of devices cooperate with each other. An example of the system in which a plurality of devices cooperate with each other may include a combination of a plurality of server devices and a combination of a server device and a terminal device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control device including:

a power control unit configured to determine a node that performs transmission or reception of direct-current power to or from an own node by using profile information indicating a power usage state of each of the nodes exchanging direct-current power with each other.

(2)

The control device according to (1), further including:

a display control unit configured to display the profile information such that all of the profile information of the own node is displayed and a part of the profile information of another node is concealed.

(3)

The control device according to (1), in which the display control unit displays the profile information of the other node such that other information than a charging state of a storage battery of the other node is concealed.

(4)

The control device according to (2) or (3), in which the display control unit displays information corresponding to each of the nodes such that the information is arranged around a predetermined central position.

(5)

The control device according to (4), in which the display control unit displays the information corresponding to each of the nodes such that the information comes close to the central position in a case of exchange of direct-current power between the nodes.

(6)

The control device according to any of (1) to (5), in which the power control unit determines to perform transmission or reception of direct-current power to or from a node satisfying a condition on the basis of the profile information.

(7)

The control device according to any of (1) to (6), in which the power control unit determines a counterpart node that performs transmission or reception of direct-current power on the basis of information on previous power exchange included in the profile information.

(8)

The control device according to any of (1) to (7), in which the power control unit determines a node having satisfactory compatibility in exchange of direct-current power on the basis of the profile information.

(9)

The control device according to (8), in which the display control unit displays information related to the node determined by the power control unit to have satisfactory compatibility in exchange of direct-current power to be displayed.

(10)

A control method including:

determining, by a control device, a node that performs transmission or reception of direct-current power to or from an own node by using profile information indicating a power usage state of each of the nodes exchanging direct-current power with each other.

(11)

A computer program for causing a computer to execute:

determining a node that performs transmission or reception of direct-current power to or from an own node by using profile information indicating a power usage state of each of the nodes exchanging direct-current power with each other.

REFERENCE SIGNS LIST 1 power supply system
10 direct-current power line
20 communication line
100, 100a-f node
110 control device
112 display control unit
114 power control unit
120 power generation device
130 power storage device
140 power adjustment device
150 load
160 display device
170 communication device

The invention claimed is:

1. A power-transfer control device of a node that is part of a plurality of nodes interconnected with each other, the control device comprising:

a power controller configured to determine at least one other node of the plurality of nodes able to perform transmission or reception of direct-current power to or from the node, without control by an external manager, by using profile information indicating a power usage state of each of the at least one other mode; and a display controller configured to cause icons for the plurality of nodes to be displayed, and to cause information relating to the node to be displayed, wherein the plurality of nodes represent a plurality of premises that are different from each other, wherein the plurality of nodes are able to exchange direct-current power with each other without control by an external manager, wherein each node of the plurality of nodes includes a power controller configured to determine one or more of the plurality of nodes able to perform transmission or reception of direct-current power using profile information indicating a power usage state of each of the one or more of the plurality of nodes, wherein the display controller is configured to provide a dynamically changing arrangement of icons to represent a dynamic number of nodes able to perform transmission or reception of direct-current power to or from the node, such that an icon of a new-participant node able to perform transmission or reception of direct-current power to or from the node is added to the arrangement of icons, and such that an icon of a non-participant node is removed from the arrangement of icons, and wherein the display controller causes node information corresponding to the node and each of the at least one other node to be displayed, such that the node information is arranged around a predetermined icon, and such that, of the icons displayed for the plurality of nodes, a subset of the icons corresponding to a subset of nodes participating in an exchange of direct-current power with another node is displayed with each icon of the subset of icons being shown to have animation between that icon and the predetermined icon.

2. The control device according to claim 1, wherein the display controller is configured to cause all of the profile information of the node to be displayed and a part of the profile information of the at least one other node to be concealed.

3. The control device according to claim 2, wherein the display controller causes some of the profile information of the at least one other node to be displayed such that information other than a charging state of a storage battery of the at least one other node is concealed.

4. The control device according to claim 1, wherein the display controller causes the node information corresponding to the node and each of the at least one other node to be displayed, such that the node information of a group of nodes appears to be animated to approach the predetermined icon in a case where an exchange of direct-current power between the group of nodes is occurring.

5. The control device according to claim 1, wherein the power controller is configured to determine to perform control of transmission or reception of direct-current power to or from a counterpart node of the at least one node satisfying a condition based on the profile information of the counterpart node.

6. The control device according to claim 1, wherein the power controller is configured to determine to perform control of transmission or reception of direct-current power to or from a counterpart node of the at least one node based on information on a previous power exchange included in the profile information of the counterpart node.

7. The control device according to claim 1, wherein the power controller is configured to determine a counterpart node having satisfactory compatibility to exchange direct-current power with the node based on the profile information of the counterpart node.

8. The control device according to claim 7, wherein the display controller is configured to cause the profile information of the node to be displayed and a part of the profile information of the at least one other node to be concealed, and wherein the display controller causes information related to a node determined by the power control unit to have satisfactory compatibility to exchange direct-current power to be displayed.

9. A power-transfer control method of a node of a plurality of nodes interconnected to each other, the method comprising:

determining, by a control device of the node, at least one other node of the plurality of nodes able to perform transmission or reception of direct-current power to or from the node, without control by an external manager, by using profile information indicating a power usage state of each of the at least one other node;

displaying icons for the plurality of nodes; and displaying node information corresponding to the node and each of the at least one other node, such that the node information is arranged around a predetermined icon, wherein the plurality of nodes represent a plurality of premises that are different from each other, wherein the plurality of nodes are able to exchange direct-current power with each other without control by an external manager, wherein each node of the plurality of nodes includes a power controller configured to determine one or more of the plurality of nodes able to perform transmission or reception of direct-current power using profile information indicating a power usage state of each of the one or more of the plurality of nodes, wherein the displaying of the icons provides a dynamically changing arrangement of icons to represent a dynamic number of nodes able to perform transmission or reception of direct-current power to or from the node, such that an icon of a new-participant node able to perform transmission or reception of direct-current power to or from the node is added to the arrangement of icons, and such that an icon of a non-participant node is removed from the arrangement of icons, and wherein, in the displaying of the node information, of the icons displayed for the plurality of nodes, a subset of the icons corresponding to a subset of nodes participating in an exchange of direct-current power with another node is displayed with each icon of the subset of icons being shown to have animation between that icon and the predetermined icon.

10. A non-transitory computer-readable storage medium storing executable code for a computer program for causing a computer to perform a power-transfer control method of a node of a plurality of nodes interconnected to each other, wherein the control method is comprised of:

determining at least one other node of the plurality of nodes able to perform transmission or reception of direct-current power to or from the node, without control by an external manager, by using profile information indicating a power usage state of each of the at least one other node;

causing icons for the plurality of nodes to be displayed; and causing node information corresponding to the node and each of the at least one other node to be displayed, such that the node information is arranged around a predetermined icon, wherein the plurality of nodes represent a plurality of premises that are different from each other, wherein the plurality of nodes are able to exchange direct-current power with each other without control by an external manager, wherein each node of the plurality of nodes includes a power controller configured to determine one or more of the plurality of nodes able to perform transmission or reception of direct-current power using profile information indicating a power usage state of each of the one or more of the plurality of nodes, wherein the causing of the icons for the plurality of nodes to be displayed includes causing a dynamically changing arrangement of icons to be displayed to represent a dynamic number of nodes able to perform transmission or reception of direct-current power to or from the node, such that an icon of a new-participant node able to perform transmission or reception of direct-current power to or from the node is added to the arrangement of icons, and such that an icon of a non-participant node is removed from the arrangement of icons, and wherein the node information is displayed such that, of the icons displayed for the plurality of nodes, a subset of the icons corresponding to a subset of nodes participating in an exchange of direct-current power with another node is displayed with each icon of the subset of icons being shown to have animation between that icon and the predetermined icon.

\* \* \* \* \*